(12) United States Patent
Hu

(10) Patent No.: US 12,370,439 B2
(45) Date of Patent: Jul. 29, 2025

(54) HOUSING OF GAMEPAD AND GAMEPAD

(71) Applicant: Shenzhen Qixiong Technology Co., Ltd., Shenzhen (CN)

(72) Inventor: Xiaochen Hu, Shenzhen (CN)

(73) Assignee: Shenzhen Qixiong Technology Co., Ltd., Shenzhen (CN)

( * ) Notice: Subject to any disclaimer, the term of this patent is extended or adjusted under 35 U.S.C. 154(b) by 357 days.

(21) Appl. No.: 18/130,933

(22) Filed: Apr. 5, 2023

(65) Prior Publication Data

US 2023/0241493 A1 Aug. 3, 2023

(30) Foreign Application Priority Data

Jul. 21, 2022 (CN) .......................... 202221911605.2

(51) Int. Cl.
*A63F 13/24* (2014.01)
(52) U.S. Cl.
CPC .................................. *A63F 13/24* (2014.09)
(58) Field of Classification Search
CPC ........... A63F 13/24; A63F 13/98; A63F 13/92
See application file for complete search history.

(56) References Cited

U.S. PATENT DOCUMENTS

| | | | |
|---|---|---|---|
| 9,529,447 B2* | 12/2016 | Hodges | A63F 13/24 |
| 9,711,980 B2* | 7/2017 | Hodges | A63F 13/24 |
| 2003/0195042 A1 | 10/2003 | Murzanski et al. | |
| 2005/0009606 A1 | 1/2005 | Murzanski et al. | |
| 2005/0085299 A1 | 4/2005 | Murzanski et al. | |
| 2015/0031452 A1* | 1/2015 | Rundell | A63F 13/23 |
| | | | 463/31 |
| 2023/0182011 A1* | 6/2023 | Vroom | H04M 1/72409 |
| | | | 463/39 |

* cited by examiner

*Primary Examiner* — Peter J Iannuzzi
(74) *Attorney, Agent, or Firm* — Westbridge IP LLC

(57) ABSTRACT

The present disclosure provides a housing of a gamepad and a gamepad, and relates to the technical field of game machine accessories. The housing includes housing bodies, a lifting platform and resetting members. The housing bodies include main bodies and limiting portions arranged on the main bodies. The lifting platform is slidably connected to the main bodies. A mounting space for fixing an electronic device such as a mobile phone is formed between the lifting platform and the limiting portions. The resetting members are connected to the lifting platform and the main bodies.

10 Claims, 5 Drawing Sheets

HOUSING OF GAMEPAD AND GAMEPAD

TECHNICAL FIELD

The present disclosure relates to the technical field of game machine accessories, specifically to a housing of a gamepad.

BACKGROUND

Mobile phone games have become a hobby for more and more young people. In order to facilitate operations and improve the game experience, people usually mount mobile phones or SWITCH game consoles on gamepads. When the gamepads are connected to the mobile phones or the SWITCH game controls, games in the mobile phones or the SWITCH game consoles can be controlled by using the gamepads. In order to improve the game experience, display screens of the mobile phones or the SWITCH game consoles need to always be kept flush with tops of the gamepads. However, different types of mobile phones or SWITCH game consoles may have different thicknesses. After the mobile phones or the SWITCH game consoles are mounted on the gamepads, the display screens of most of the mobile phones or the SWITCH game consoles cannot always be flush the tops of the gamepads, resulting in poor compatibility.

SUMMARY

Based on this, it is necessary to provide a housing of a gamepad, to solve the problems that existing gamepads cannot make display screens of most mobile phones or SWITCH game consoles always flush with tops of the gamepads, resulting in poor compatibility.

The present disclosure provides a housing of a gamepad, including:
housing bodies, which include main bodies and limiting portions, wherein the limiting portions are arranged on the main bodies;
a lifting platform, which is slidably connected to the main bodies, wherein a mounting space for fixing the electronic device is formed between the lifting platform and the limiting portions; and
resetting members, which are connected to the lifting platform and the main bodies, wherein the resetting members release resetting forces to drive the lifting platform to approach the limiting portions, to reduce a size of the mounting space to fix the electronic device; under the action of an external force, the lifting platform is away from the limiting portions, to increase the size of the mounting space to relieve restrictions on the electronic device; and the lifting platform drives the resetting members to accumulate resetting forces.

The housing of the gamepad can be used as a housing of a gamepad. To play a mobile phone game or a SWITCH game, a mobile phone or the SWITCH game console can be placed in the mounting space of the housing, and a size of the mounting space can be adaptively adjusted through the resetting members according to a thickness of the mobile phone or the SWITCH game console, so that a display screen of the mobile phone or the SWITCH game console resists against the limiting portions. The limiting portions can be located at a top of the gamepad, so that the display screen of the mobile phone or the SWITCH game console is kept at the top of the gamepad, and a user has a good game experience. The housing of the gamepad is high in compatibility, on which most mobile phones or SWITCH game consoles with different thicknesses can be mounted, and the display screens of the mobile phones or SWITCH game consoles are aligned with the top of the gamepad.

In one embodiment, the resetting members are springs, and the resetting forces are elastic forces.

In one embodiment, each main body is provided with a fixed pillar; fixing slots are formed in the lifting platform; the springs sleeve the fixed pillars; and two ends of the springs resist against the main bodies and slot bottoms of the fixing slots.

In one embodiment, guide chutes are formed in the main bodies; the lifting platform includes guide plugs; and the guide plugs are slidably plugged into the guide chutes, so that the lifting platform is slidably connected to the main bodies.

In one embodiment, the lifting platform includes a first side and a second side which are opposite to each other, and a third side and a fourth side which are opposite to each other; and the first side and the second side are both connected with the housing body.

In one embodiment, the resetting members are arranged on both the first side and the second side, and the plurality of resetting members are arranged in a lengthwise extending direction of the first side and a lengthwise extending direction of the second side; and the plurality of resetting members can simultaneously release the resetting forces to drive the lifting platform to approach the limiting portions.

In one embodiment, at least one of the third side and the fourth side is provided with a limiting baffle plate to restrict the electronic device located in the mounting space from being separated from the mounting space.

In one embodiment, the limiting portions include a plurality of limiting flanges; and the plurality of limiting flanges are linearly arranged at intervals or are of an integrated structure; or the main bodies are provided with limiting baffle plates.

In one embodiment, anti-skid pads are arranged on side walls of the mounting space; and the anti-skid pads are used for restricting the electronic device located in the mounting space from sliding.

The present disclosure further provides a gamepad, including circuit boards, control panels, and the above housing of a gamepad; the control panels are electrically connected to the circuit boards; and the circuit boards can be connected to the electronic device arranged in the mounting space, so that the control panels are connected to the electronic device.

Figure 1:
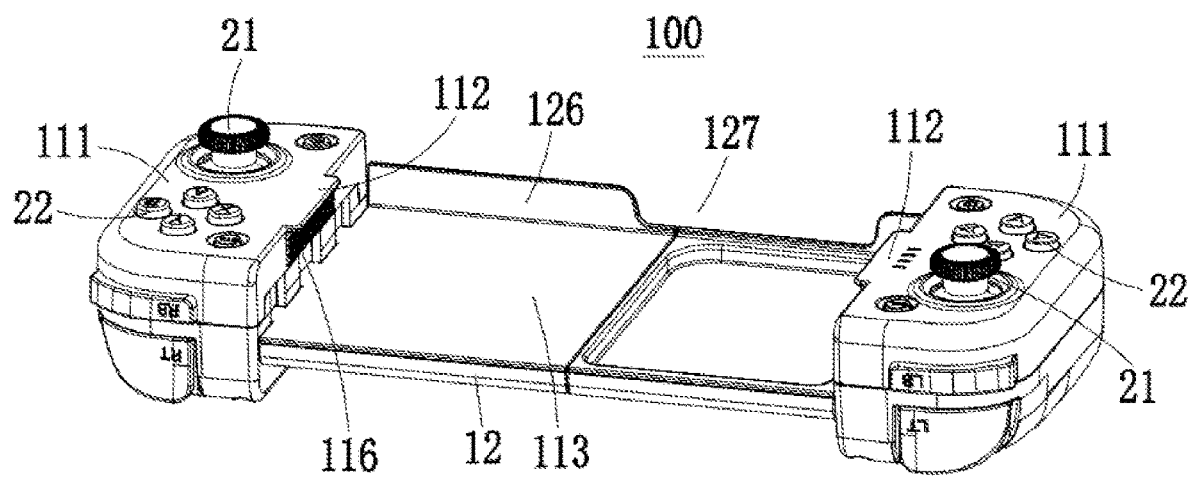
FIG. 1 is a schematic structural diagram of a gamepad of the present disclosure in one visual angle.

In the drawings, a list of components represented by the respective reference signs is as follows:
100: gamepad;
1: housing; 11: housing body; 111: main body; 1111: accommodating cavity; 112: limiting portion; 113: mounting space; 114: fixed pillar; 115: guide chute;

116: anti-skid pad; 12: lifting platform; 121: guide plug; 122: first side; 123: second side; 124: third side; 125: fourth side; 126: limiting baffle plate; 127: gap; 128: fixing slot; 13: resetting member;

2: control panel; 21: lever; 22: control button; and

3: circuit board.

DETAILED DESCRIPTION OF THE EMBODIMENTS

In order to make the foregoing objectives, features and advantages of the present disclosure more obvious and understandable, specific implementations of the present disclosure are described clearly and completely below with reference to the accompanying drawings. Obviously, specific details described below are only part of the embodiments of the present disclosure, and the present disclosure can also be implemented in many different embodiments than those described herein. Based on the embodiments in the present disclosure, all other embodiments obtained by those of ordinary skill in the art without creative work shall fall within the protection scope of the present disclosure.

It should be noted that when an element is referred to as being "fixed" to another element, it can be directly on the other element or an intermediate element may also exist. When one element is considered to be "connected" to another element, it can be directly connected to another element or there may be a central element at the same time. The terms "perpendicular", "horizontal", "left", "right" and similar expressions used herein are for illustrative purposes only, and are not meant to be the only implementation modes.

Unless otherwise defined, all technical and scientific terms used herein are the same as meanings of general understandings of those skilled in the art of the present disclosure. The terms used in the description of the present disclosure herein are merely to describe the specific embodiments, not intended to limit the present disclosure.

Figure 2:
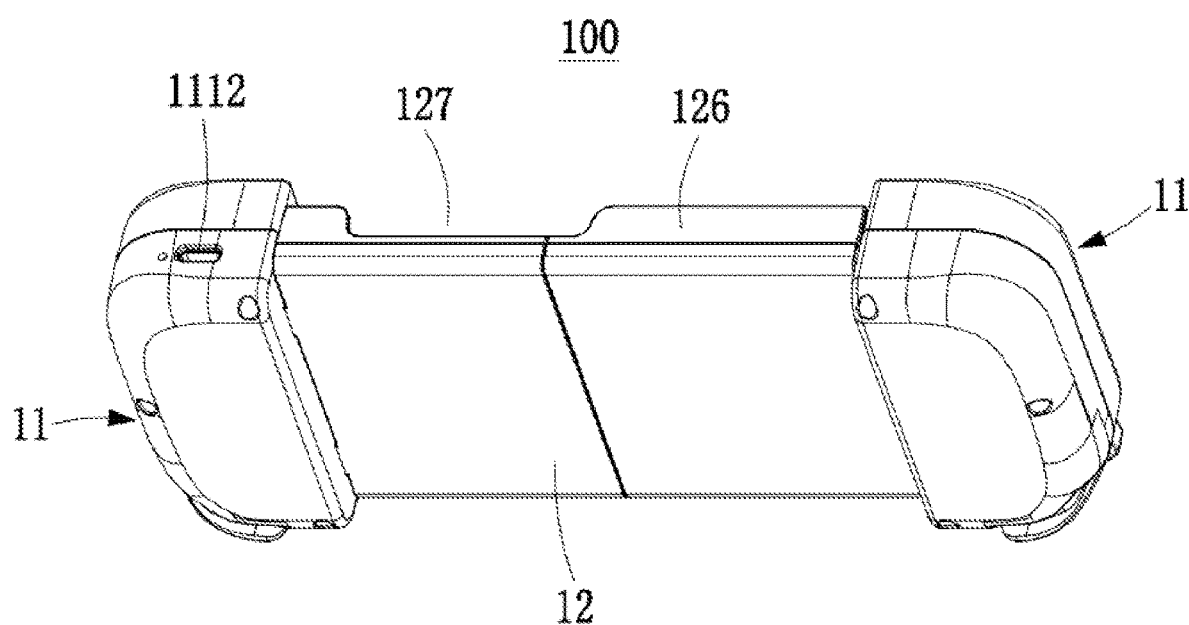
FIG. 2 is a schematic structural diagram of a gamepad of the present disclosure in another visual angle.

Referring to FIG. 1 and FIG. 2, the present disclosure provides a gamepad 100. The gamepad 100 is used for mounting and fixing a gaming device and is connected to the gaming device, so that games in the gaming device are controlled by using the gamepad 100. In addition, the gamepad 100 can keep the gaming device at a top of the gamepad, so that it is not easy for the gaming device to move relative to the gamepad, and a user has a good game experience in using the gamepad 100. The gaming device can be a mobile phone, a SWITCH game console, a tablet computer, and the like.

The gamepad 100 includes a housing 1, control panels 2 and circuit boards 3. The control panels 2 are arranged on a surface of the housing 1. The circuit boards 3 are arranged inside the housing 1. The operation panels 2 are electrically connected to the circuit boards 3.

Each control panel 2 includes a lever 21 and control buttons 22. The lever 21 can be used for controlling directions, for example, controlling movements of characters in a game. The control buttons 22 can be cyclically pressed to perform instructions of the game. When the gaming device is mounted on the housing 1, the gaming device can be electrically connected to the circuit boards 3, for example, through Bluetooth or a data wire, so that the control panels 2 are connected to the gaming device, and the user can control the game in the gaming device by operating the levers 21 and the control buttons 22.

The housing 1 is provided with the levers 21 and the control buttons 22 on two opposite sides in a lengthwise direction, so that the user can place the gamepad 100 forward or backward and can operate both the levers 21 with the left hand and operate the control buttons 22 with the right hand, and the operation is convenient.

Figure 3:
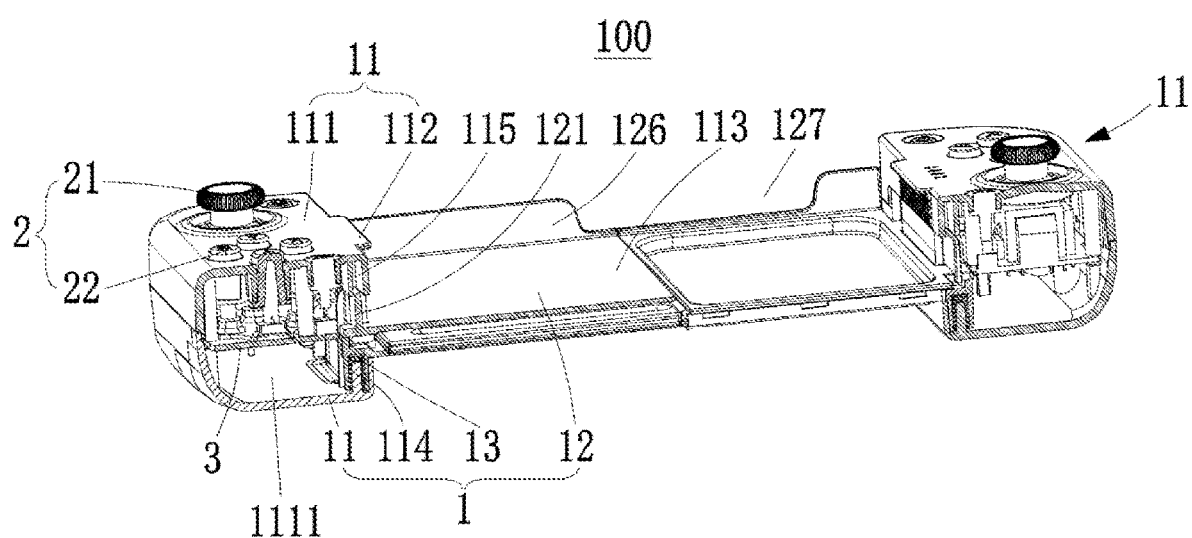
FIG. 3 is a schematic diagram of a sectional structure of a gamepad of the present disclosure.

Referring to FIG. 3, the housing 1 includes housing bodies 11, a lifting platform 12 and resetting members 13. The lifting platform 12 is slidably connected to the housing bodies 11, and the resetting members 13 are connected to the housing bodies 11 and the lifting platform 12.

The housing bodies 11 include main bodies 111 and limiting portions 112. The limiting portions 112 are arranged at tops of the main bodies 111. The limiting portions 112 and the main bodies 111 are of an integrated structure, so that the connection is stable. In other embodiments, the limiting portions 112 and the main bodies 111 can also be connected in other ways, for example, in a clamping or fastening detachable connection way, which is not limited here.

Accommodating cavities 1111 are arranged in the main bodies 111. The accommodating cavities 1111 are used for accommodating electronic parts such as the circuit boards 3, and the resetting members 13 are also located in the accommodating cavities 1111. On end of each resetting member 13 is connected to each main body 111, and the other end is connected to the lifting platform 12.

Referring to FIG. 2, a charging jack 1112 is formed in surfaces of the main bodies 111. The charging jack 1112 is used for connecting one end of a USB cable, and the other end of the USB cable can be connected to an external power supply to supply power to the circuit boards 3.

Figure 5:
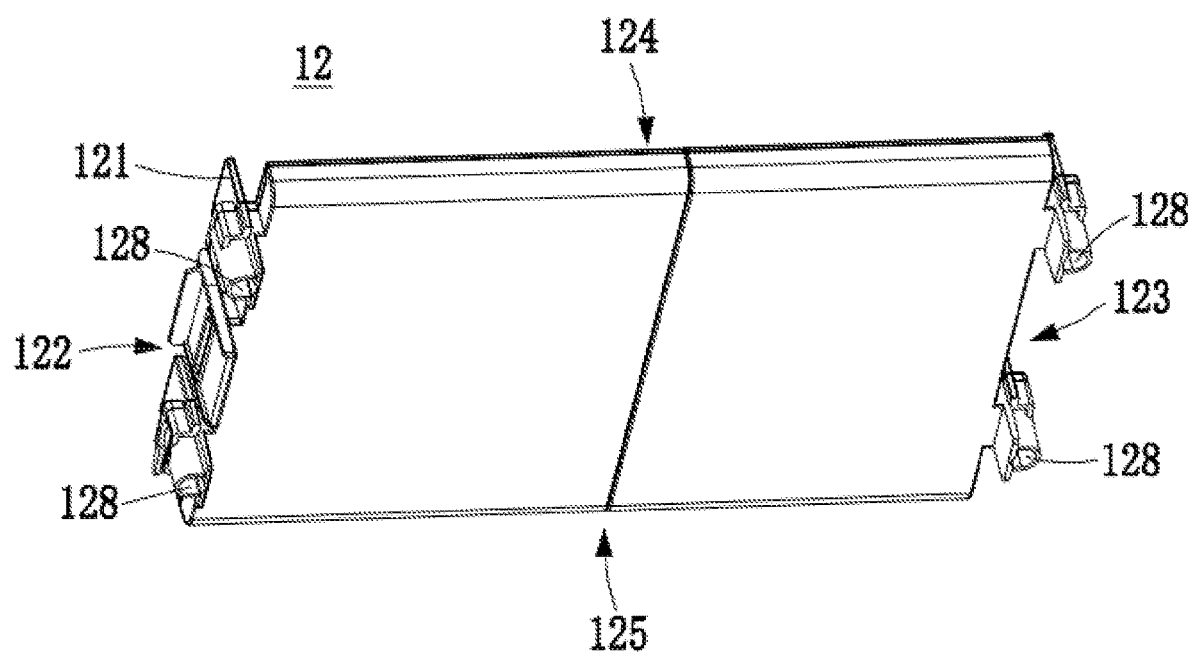
FIG. 5 is a schematic structural diagram of a lifting platform of the present disclosure in another visual angle.

Referring to FIG. 3, each main body 111 is provided with a fixed pillar 114. Fixing slots 128 (shown in FIG. 5) are formed in the lifting platform 12. The resetting members 13 sleeve the fixed pillars 114. Two ends of the resetting members 13 resist against the main bodies 111 and slot bottoms of the fixing slots 128. The fixed pillars 114 are used for playing a fixing role on the resetting members 13. The fixing slots 128 encircle the resetting members 13, so that the lifting platform 12 can drive the resetting members 13 to accumulate resetting forces when sliding up and down relative to the main bodies 111. The resetting members 13 can also release the resetting forces to drive the lifting platform 12 to slide relative to the main bodies 111.

Figure 4:
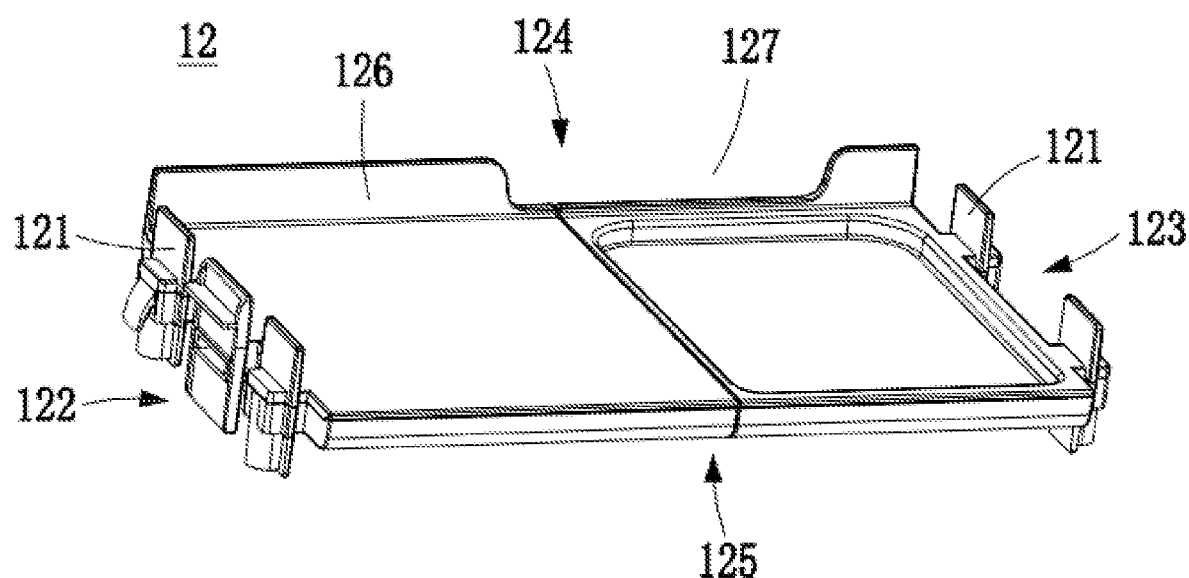
FIG. 4 is a schematic structural diagram of a lifting platform of the present disclosure in one visual angle.

Referring to FIG. 3 and FIG. 4, guide chutes 115 are formed in the main bodies 111. The lifting platform 12 includes guide plugs 121. The guide plugs 121 are slidably plugged into the guide chutes 115, so that the lifting platform 12 is slidably connected to the main bodies 111. The lifting platform 12 can slide up and down in a fixed direction relative to the main bodies 111, to approach or be away from the limiting portions 112.

Referring to FIG. 3, the limiting portion 112 in the embodiment shown in FIG. 3 is a limiting flange that protrudes towards one side of the lifting platform 12. A mounting space 113 is formed between the limiting flange and the lifting platform 12. The mounting space 113 is used for accommodating and fixing the gaming device. When the lifting platform 12 slides towards the limiting flanges, a size of the mounting space 113 decreases to accommodate a relatively thin gaming device. When the lifting platform 12 slides away from the limiting flanges, the size of the mounting space 113 increases to accommodate a relatively thick gaming device, so that the housing 1 is high in compatibility and can accommodate most gaming devices with different thicknesses.

Of course, in other embodiments, the limiting portions 112 may further include a plurality of limiting flanges. The plurality of limiting flanges are linearly arranged at intervals or are of an integrated structure, which can cooperate with the lifting platform 12 to clamp and fix the gaming device.

It should be noted that the limiting portions 112 are located at the tops of the main bodies 111, so that when the gaming device is fixed in the mounting space 113, a top of the gaming device resists against the limiting portions 112. It can also be understood that a display screen of the gaming device is flush with the tops of the main bodies 111, so that the user has a better game experience.

There are two housing bodies 11 in the embodiments shown in FIG. 1 to FIG. 3. The two housing bodies 11 are slidably connected to two opposite sides of the lifting platform 12, so that the whole lifting platform 12 can slide up and down relative to the housing bodies 11, to comprehensively adjust the overall position of the gaming device located in the mounting space 113.

The resetting members 13 are springs, and the resetting forces are elastic forces. The resetting members 13 can release the elastic forces to drive the lifting platform 12 to slide towards the limiting portions 112, to reduce the size (the thickness) of the mounting space 113. The user can also manually press the lifting platform 12 to drive the lifting platform 12 to slide away from the limiting portions 112, to increase the size of the mounting space 113, and the lifting platform 12 presses the springs to accumulate the elastic forces.

It can be understood that in other embodiments, each resetting member 13 can also be composed of two magnetic attracting members. One magnetic attracting member is arranged on the fixed pillar 114, and the other magnetic attracting member is arranged at the slot bottom of the fixing slot 128. In the process that the lifting platform 12 slides up and down, the two magnetic attracting members are close to or away from each other, which can accumulate or release magnetic forces.

The user can first press the lifting platform 12 when mounting and fixing the gaming device, to maximize the size of the mounting space 113, and then the user places the gaming device in the mounting space 113 and withdraws an acting force applied to the lifting platform 12. The resetting members 13 release the resetting forces to drive the lifting platform 12 to slide towards the limiting portions 112 to press the gaming device, to drive the top of the gaming device to resist against the limiting portions 112.

The lifting platform 12 includes a first side 122 and a second side 123 which are opposite to each other, and a third side 124 and a fourth side 125 which are opposite to each other. The first side 122 and the second side 123 are both slidably connected to the above main bodies 111 through the guide plugs 121 provided.

The fixing slots 128 are formed in the first side 122 and the second side 123. A plurality of resetting members 13 are arranged in the fixing slots 128 in a lengthwise extending direction of the first side 122 and a lengthwise extending direction of the second side 123. The plurality of resetting members 13 can simultaneously release the resetting forces to drive the lifting platform 12 to approach the limiting portions. The user can also press the lifting platform 12 to drive the lifting platform 12 to simultaneously press the plurality of resetting members 13, to drive the plurality of resetting members 13 to accumulate resetting forces. Since the plurality of resetting members 13 release and accumulate the resetting forces, the stability of supporting the lifting platform 12 is better, and the display screen of the gaming device can be stably maintained at the top.

The third side 124 is provided with a limiting baffle plate 126. The limiting baffle plate 126 is used for restricting the gaming device located in the mounting space 113 from being separated from the mounting space 113, to mount the gaming device more stably.

Of course, in other embodiments, both the third side 124 and the fourth side 125 can be provided with limiting baffle plates 126, to restrict, in all directions, the gaming device located in the mounting space 113 from being separated from the mounting space 113, so that the gaming device is mounted more stably. In another feasible embodiment, the limiting baffle plate 126 can also be arranged on the main body 111, which can also achieve a limiting effect on the gaming device.

A gap 127 is formed in the limiting baffle plate 126. The gap 127 is used for exposing a functional button on a side portion of the gaming device, so that the user can still operate the functional button of the gaming device when the gaming device is located in the mounting space 113.

Anti-skid pads 116 are arranged on two side walls of the mounting space 113, and the anti-skid pads 116 are used for restricting the gaming device located in the mounting space 113 from sliding, so that the gaming device is mounted in the mounting space 113 more stably.

The technical features of the embodiments described above can be arbitrarily combined. In order to make the description concise, all possible combinations of various technical features in the above embodiments are not completely described. However, the combinations of these technical features should be considered as the scope described in this specification as long as there is no contradiction in them.

The above-mentioned embodiments only express several implementation modes of the present disclosure, and their descriptions are more specific and detailed, but they cannot be understood as limiting the patent scope of the present disclosure. It should be noted that those of ordinary skill in the art can further make various transformations, replacements and improvements without departing from the concept of the present disclosure, and these transformations, replacements and improvements all fall within the protection scope of the present disclosure. Therefore, the protection scope of the patent of the present disclosure shall be subject to the appended claims.

What is claimed is:

1. A housing of a gamepad, used for mounting an electronic device, wherein the housing comprises:
    housing bodies, which comprise main bodies and limiting portions, wherein the limiting portions are arranged on the main bodies;
    a lifting platform, which is slidably connected to the main bodies, wherein a mounting space for fixing the electronic device is formed between the lifting platform and the limiting portions; and
    resetting members, which are connected to the lifting platform and the main bodies, wherein the resetting members release resetting forces to drive the lifting platform to approach the limiting portions, to reduce a size of the mounting space to fix the electronic device; under the action of an external force, the lifting platform is away from the limiting portions, to increase the size of the mounting space to relieve restrictions on the electronic device; and the lifting platform drives the resetting members to accumulate resetting forces.

2. The housing of the gamepad according to claim 1, wherein the resetting members are springs, and the resetting forces are elastic forces.

3. The housing of the gamepad according to claim 2, wherein each main body is provided with a fixed pillar; fixing slots are formed in the lifting platform; the springs sleeve the fixed pillars; and two ends of the springs resist against the main bodies and slot bottoms of the fixing slots.

4. The housing of the gamepad according to claim 1, wherein guide chutes are formed in the main bodies; the lifting platform comprises guide plugs; and the guide plugs are slidably plugged into the guide chutes, so that the lifting platform is slidably connected to the main bodies.

5. The housing of the gamepad according to claim 1, wherein the lifting platform comprises a first side and a second side which are opposite to each other, and a third side and a fourth side which are opposite to each other; and the first side and the second side are both connected with the housing body.

6. The housing of the gamepad according to claim 5, wherein the resetting members are arranged on both the first side and the second side, and the plurality of resetting members are arranged in a lengthwise extending direction of the first side and a lengthwise extending direction of the second side; and the plurality of resetting members simultaneously release the resetting forces to drive the lifting platform to approach the limiting portions.

7. The housing of the gamepad according to claim 5, wherein at least one of the third side and the fourth side is provided with a limiting baffle plate to restrict the electronic device located in the mounting space from being separated from the mounting space; or the main bodies are provided with limiting baffle plates.

8. The housing of the gamepad according to claim 1, wherein the limiting portions comprise a plurality of limiting flanges; and the plurality of limiting flanges are linearly arranged at intervals or are of an integrated structure.

9. The housing of the gamepad according to claim 1, wherein anti-skid pads are arranged on side walls of the mounting space; and the anti-skid pads are used for restricting the electronic device located in the mounting space from sliding.

10. A gamepad, comprising circuit boards, control panels, and the housing of a gamepad according to claim 1, wherein the control panels are electrically connected to the circuit boards; and the circuit boards are connected to the electronic device arranged in the mounting space, so that the control panels are connected to the electronic device.

* * * * *